(12) United States Patent
Mahajan

(10) Patent No.: US 6,230,211 B1
(45) Date of Patent: May 8, 2001

(54) CONTAINER-BASED METHOD FOR EXCHANGING INFORMATION BETWEEN COMPUTER PROCESSES

(75) Inventor: Rakesh Mahajan, Laguna Hills, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/005,769

(22) Filed: Jan. 19, 1993

(51) Int. Cl.[7] ........................................ G06F 9/00
(52) U.S. Cl. ............................................... 709/315
(58) Field of Search ........................ 395/650, 425, 395/700, 917, 934, 682, 200.37, 500, 200.53; 364/228.7, 228.9, 963.3, 974.5; 707/101, 200; 709/310–332

(56) References Cited

U.S. PATENT DOCUMENTS

| | | | |
|---|---|---|---|
| 4,212,057 | * 7/1980 | Dentin et al. | 364/DIG. 2 |
| 4,525,780 | * 6/1985 | Bratt et al. | 364/200 |
| 4,914,586 | * 4/1990 | Swinehart et al. | 707/101 |
| 5,129,083 | * 7/1992 | Cutler et al. | 395/600 |
| 5,220,674 | * 6/1993 | Morgan et al. | 395/200.53 |
| 5,367,698 | * 11/1994 | Webber et al. | 395/200.33 |
| 5,432,928 | * 7/1995 | Sherman | 395/600 |
| 5,452,447 | * 9/1995 | Nelson et al. | 395/650 |
| 5,463,774 | * 10/1995 | Jenness | 395/600 |
| 5,475,819 | * 12/1995 | Miller et al. | 395/200.03 |
| 5,535,375 | * 7/1996 | Eshel et al. | 395/500 |
| 5,745,902 | * 4/1998 | Miller et al. | 707/200.3 |

OTHER PUBLICATIONS

Gehringer, Edward F., "Name–Based Mapping: Addressing Support for Persistent Objects," Dept. of Electrical Engineering, University of Newcastle, Austalia, published by Bristish Computer Society, Alden Press Ltd., Oxford, pp. 218–231, 1990.*
"Microsoft Windows Programmer's Reference" Microsoft Press, 1990 pp. 15–1 to 15–18.*
M. Heller, "Strengthening the ties that bind", Windows Magazine, Mar. 1993, pp. 129–134.

* cited by examiner

Primary Examiner—Alvin E. Oberley
Assistant Examiner—St. John Courtenay, III
(74) Attorney, Agent, or Firm—Fitzpatrick, Cella, Harper & Scinto

(57) ABSTRACT

A method for exchanging information between two computer processes wherein the two computer processes deposit and retrieve information into a container rather than exchanging information directly with each other. The container stores the information based on the name of the information assigned by the depositing computer process, and maintains a dictionary of the names of the information contained in the container. Information is retrieved by the retrieving computer process by querying the container for the information by information name.

178 Claims, 6 Drawing Sheets

PAPER

PAPER_TRAYS:   8 1/2 X 11
                              8 1/2 X 14
    FEED_AUTO/MANUAL:   AUTO
    TRAY_SELECTED:   8 1/2 X 11
    PORTRAIT/LANDSCAPE:   PORTRAIT

FONTS

AVAILABLE_FONTS:   COURIER_10 PT
                                     COURIER_12 PT
                                     UNIVERS_10 PT
                                     UNIVERS_12 PT
                                     ROMAN_10 PT
                                     ROMAN_12 PT
    DEFAULT_FONT:   COURIER_12 PT
    CURRENT_FONT:   COURIER_12 PT

ERROR_CONDITION:   NONE

PRINT_JOB_STATUS:   WAITING

DUPLEX_PRINTING

AVAILABLE:   YES
    DEFAULT_SETTING:   NO
    CURRENTLY_SET:   NO

COLLATING

AVAILABLE:   NO

STAPLING

AVAILABLE:   YES
    DEFAULT_SETTING:   NO
    CURRENTLY_SET:   YES
    STAPLER_EMPTY:   NO

FIG.4

CONTAINER-BASED METHOD FOR EXCHANGING INFORMATION BETWEEN COMPUTER PROCESSES

BACKGROUND OF THE INVENTION

1. Field of the Invention

The present invention pertains to a method by which information may be exchanged between computer processes using a container-based exchange medium. More specifically, the present invention relates to an information exchange method whereby the computer processes, rather than exchanging information directly, exchange information by depositing and/or retrieving information in a container.

2. Description of The Related Art

Application programs that execute on today's computing equipment rarely possess all the functionality that is needed for the application program to execute fully. Rather, those application programs rely on external libraries of other programs in order to execute all programs for the functionality that is required. For example, an application program may rely on an external library containing device drivers such as printer drivers or monitor drivers in order to output data, and the application program may rely on the computer operating system, such as DOS, to store and to retrieve information from files. Likewise, the application program may use functionality that is not even present on the computer in which the application program is running; for example, in a network environment, the application program may print information to a printer that is not physically co-located with the computer and which is controlled by an altogether different computer.

Traditionally, the mechanism for passing information between the application program and other programs is through shared memory in which both the application program and the other program are aware of the structure of the information stored in the shared memory. For example, to print information on a printer, the application program stores the print information in a pre-designated block of shared memory, and then signals the print driver that the print information is stored in the shared memory. The print driver, knowing the structure by which the print data has been stored in shared memory, retrieves the print information from shared memory and executes printing processing.

Such a structured information exchange using shared memory has been found to be unsatisfactory. In particular, the shared memory must be reserved at compile time by the compiler and resolved into specific memory addresses at load time by the operating system loading program. Thus, memory which is potentially used only infrequently may be wasted.

Second, both the application program and the other program must have knowledge of the structure of shared memory. For example, if an application program has queried a print driver for the current printer setup and capabilities, the application program must have knowledge of how the printer driver will store that information in memory, for example, fonts first, then paper trays, then collating capabilities, and so on.

Finally, direct information exchange using shared memory is inflexible. Once the structure of shared memory is defined, which normally occurs early on in system design, the structure cannot be changed lest the new structure be incompatible with the old structure. Accordingly, as new system capabilities are provided, for example, upgrading a printer to a printer that includes a stapler, those new capabilities cannot be accessed by the application program because there is no provision in the shared memory area for defining the parameters of the new capability.

SUMMARY OF THE INVENTION

It is the object of the present invention to address the foregoing difficulties.

In one aspect, the invention is a method for exchanging information between two computer processes, for example, between a application program such as a word processing program and a print server program that controls printing on a printer, using a container-based exchange wherein the two computer processes deposit and retrieve information into the container rather than exchanging information directly with each other. The container stores the information based on the name of the information assigned by the depositing computer process, and maintains a dictionary of the names of the information contained in the container. Memory is allocated dynamically as information is deposited. Information is retrieved by the retrieving computer process by querying the container for the information by information name.

According to this aspect of the invention, a method for exchanging information between first and second computer processes comprises executing the first computer process to set named information values into a container. In response to setting the named information into the container, container processing is executed to store the value of the named information and to update a dictionary of names in the case where the named information is not already in the dictionary. The second computer process is executed to get named information from the container and designates a buffer into which the container places the information value. In response to a command to get named information from the container, container processing is executed to store the value of the named information into the designated buffer by reference to the dictionary of names, or to store an error code in the case where the dictionary of names does not include the requested name.

In case the second computer process does not know the names of information stored in the container, the second process can instead request for the first named value stored in the container's dictionary and then for subsequent values, whereby the second process may interactively proceed through all values stored in the container.

By virtue of the foregoing arrangement, memory need not be allocated at compilation time but rather is dynamically allocated during execution. There is no need for the two computer processes to know the structure of a shared memory area because storage and retrieval is based on names of information rather than position. Finally, complete flexibility is offered since any values can be stored in the container rather than only values which may have been designated early on in design.

This brief summary has been provided so that the nature of the invention may be understood quickly. A more complete understanding of the invention can be obtained by reference to the following detailed description of the preferred embodiment thereof and to the drawings.

BRIEF DESCRIPTION OF THE DRAWINGS

FIG. 4 is a view of a dialogue box displayed on the first networked work station.

DETAILED DESCRIPTION OF THE PREFERRED EMBODIMENT

Figure 1:
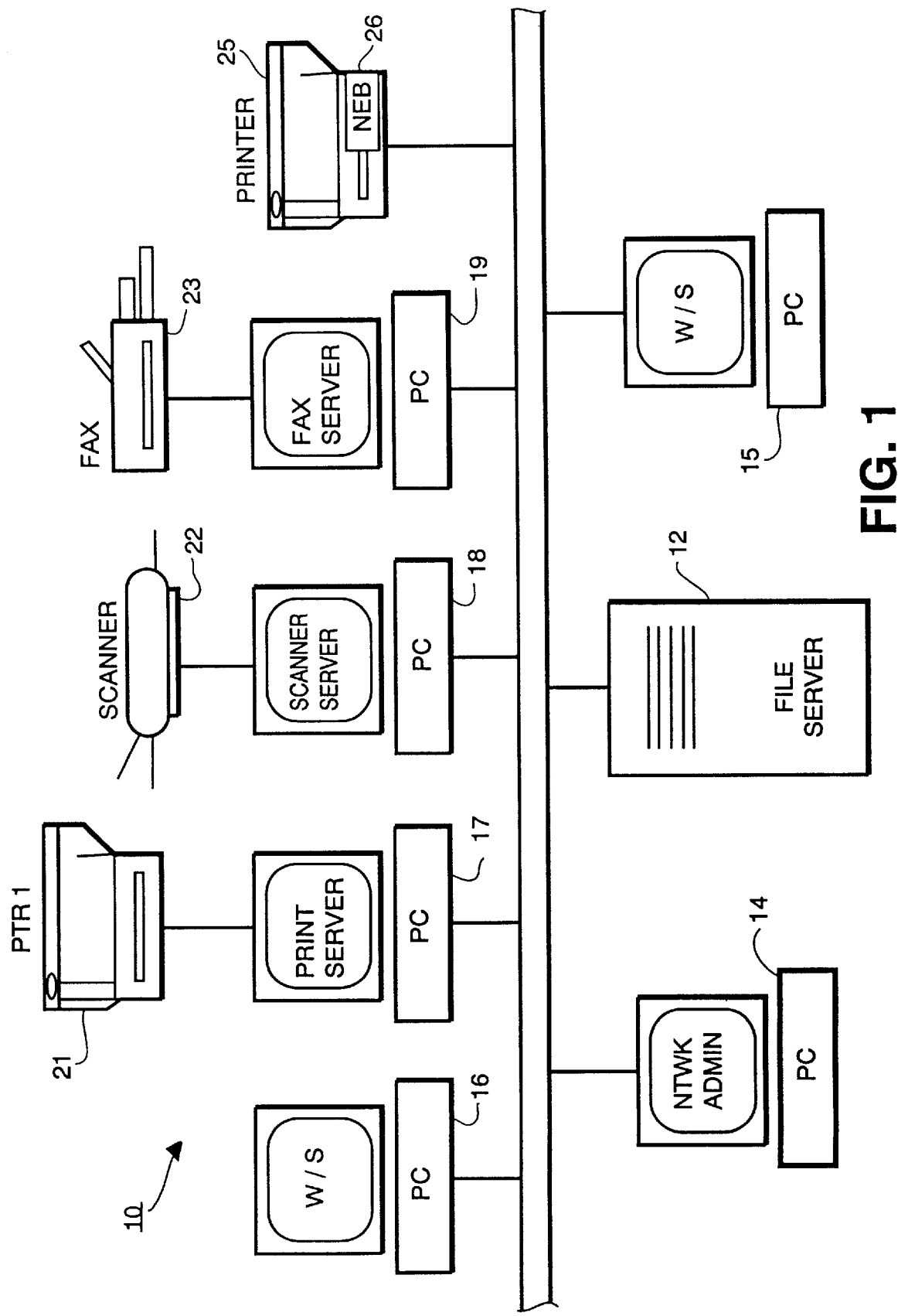
FIG. 1 is a representational view of a local area network according to the present invention.

FIG. 1 is a representational view of a local area network ("LAN") 10 according to the invention. As seen in FIG. 1, LAN 10 includes a LAN communication bus 11, such as Ethernet, for carrying LAN communications among the network devices attached to the bus. A file server 12 is attached to LAN bus 11 and acts as a file manager for receiving, storing, queuing, caching and transmitting files between networked devices. File server 12 typically includes a large capacity memory storage device, such a ten gigabyte hard disc, for performing its file manager duties. File server 12 operates under a network operating system such as Netware®.

Also attached to LAN bus 11 are work stations 14, 15, 16, 17, 18 and 19 which in this case are shown as personal computing equipment such as IBM PC or PC-compatible computers. Station 14 may be designated as a network administrator work station from which various network functions are controlled. Work stations 15 and 16 are network user work stations and include various application programs such as word processing application programs, spread sheet application programs, optical character recognition application programs, and other information and data processing programs. Those programs may physically be stored in work stations 15 and 16, or they may be retrieved for execution at those work stations from file server 12.

Work stations 17, 18 and 19 are peripheral server work stations and exist primarily to provide network services for the peripherals to which they are connected. Thus, work station 17 is a print server work station and provides network services for printer 21. Likewise, work station 18 is a scanner server work station and provides network services for scanner 22, and work station 19 is a facsimile server work station and provides network services for facsimile 23. Other peripheral devices may also be connected to the network, and it is possible for a single work station to service more than one peripheral device. In particular, it is possible for work station 17 to service more than one printer, and it is also possible, with appropriate equipment, for a single work station to service a variety of different types of devices.

While it is ordinarily necessary to provide a dedicated work station to service one or more peripheral devices, in some instances this is not necessary. Thus, for example, printer 25 is connected directly to LAN bus 11 via a network expansion board 26 which provides the necessary print server functions without the necessity of dedicating a work station for those printer services.

Other devices may be connected to LAN 10, and indeed LAN 10 may be connected as part of a wide area network ("WAN") through various backbone and transponder connectors. These arrangements are well known to those skilled in the art and are omitted in the interest of brevity.

Figure 2:
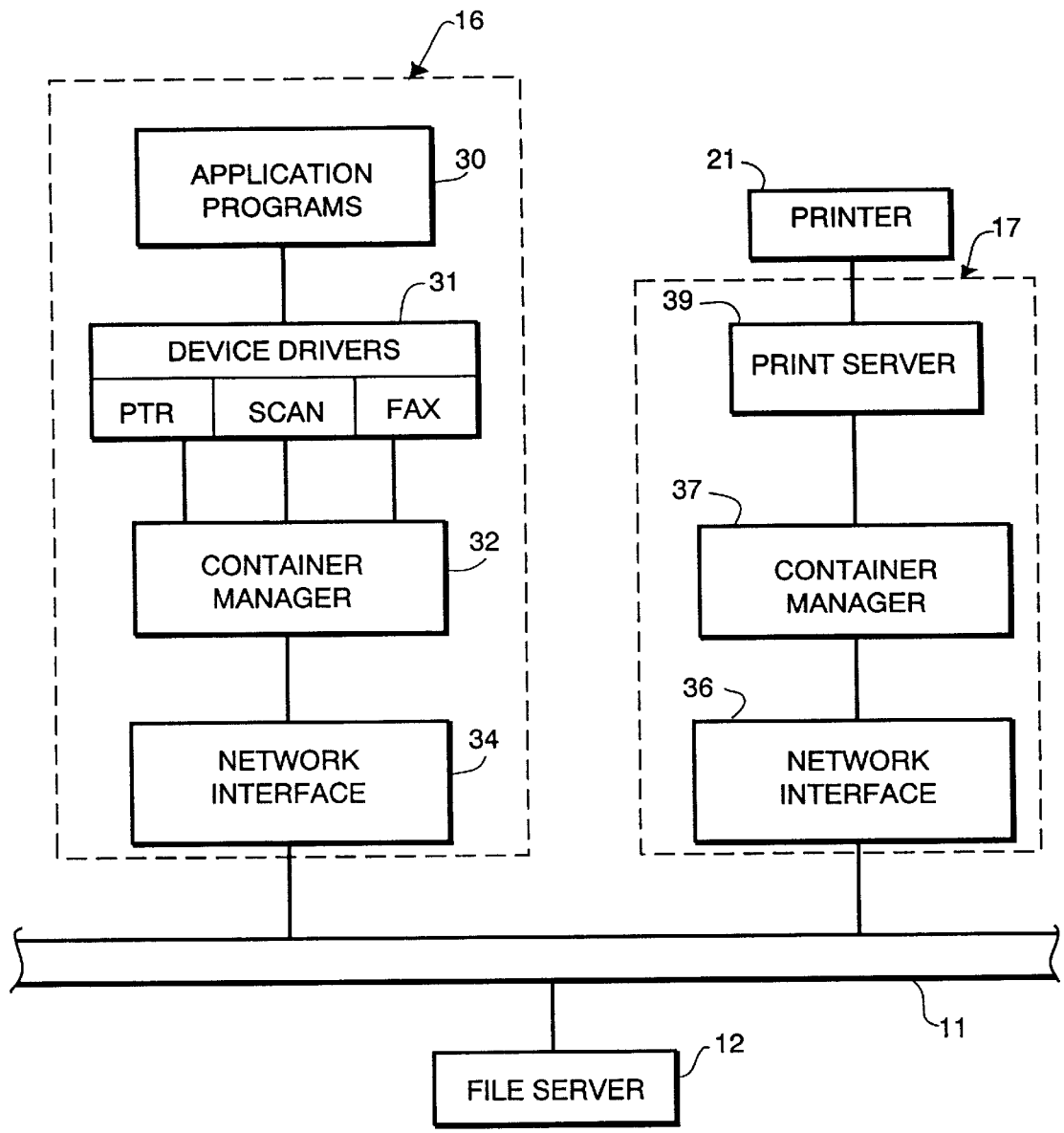
FIG. 2 is a functional block diagram of network communications between a first computer process comprising an application program executing in a first networked work station, and a second computer process comprising a print server executing in a second networked work station.

FIG. 2 is a functional block diagram showing information exchange according to the present invention. In FIG. 2, information exchange is illustrated between a first computer process such as an application program executing on one of the work stations illustrated in FIG. 1 (here, work station 16), and a second computer process such as a print server executing on work station 17. It is to be understood that the computer processes illustrated in FIG. 2 are representative only; information exchange can take place between any of the devices illustrated in FIG. 1 such as between work stations 15 and 16 or between one of the work stations and either the scanner server work station 18 or the facsimile server work station 19. Moreover, information exchange shown in FIG. 2 is illustrated between different work stations on a local area network where the need for flexible information exchange is the most critical. It is to be understood, however, that information exchange according to the invention may occur between different computing processes within the same work station, for example, between a word processing application program that is importing numerical data and a spread sheet processing application program which is providing the numerical data.

As shown in FIG. 2, information exchanges occur between a first computer process comprising device drivers 31, which in turn are controlled by an application program 30 executing in work station 16, and a second computer process comprising a print server 39 executing in print server work station 17. The precise details of application program 30 that is executing in work station 16 are unimportant to the present invention, and the application program may, for example, be a word processing application program, a spread sheet processing application program, or any other application program. In the course of execution of application program 30, the services of a peripheral device are required. The application program 30 obtains those services via one of device drivers 31 such as a printer driver, a scanner driver or a facsimile driver. The device driver, in turn, accesses the device through container manager 32 and communicates on LAN bus 11 via network interface 34. Container manager 32 operates to manage access to a container which may, for example, be stored as a file on file server 12.

In like manner, work station 17 includes a network interface 36 by which it interfaces with LAN bus 11, a container manager 37 which manages the print server's access to the container, and the print server 39 which directly controls printer 21.

In general, information exchange between device driver 31 and print server 39 is accomplished through a container into which one of those computer processes deposits named information values and from which the other computer process retrieves information by requesting the value of the named information. For example, device driver 31 may signal print server 39 to provide the setup and control parameters of printer 21. In response, print server 39 causes container manager 37 to create a container, if one has not already been created by the print server, and to deposit named information values into the container. As named information values are being deposited into the container, the container updates a dictionary of names by which those values may be retrieved. After the container has been filled by printer server 39, it is delivered across the network to device driver 31 which in turn may retrieve the setup and control parameters by requesting the container to provide those values by name. In response to each such request, the container refers to its dictionary to determine whether the requested name is stored in the container, and if the named information value is stored in the container the container provides the requested information to device driver 31. If the requested name is not in the container then an error value is returned. The print driver may display the setup and control parameters obtained from the print server and allow the computer operator to modify or change the parameters, whereafter the print driver sets the changed parameters back to the container and advises the print server that the values have been changed. The print server can then retrieve the changed parameters from the container.

After the parameters have been received by print driver 31, the print driver 31 may send a print job back to print server 39 also via a container. In this case, the print driver 31 creates a container, for example, in file server 12, and sets print job information into the container by name. Print driver 31 then advises print server 39 that a print job is present in the container, whereupon the print server 39 retrieves the print information by name from the container and controls printer 21 to execute the print job.

The containers created in this information exchange are objects that contain an indexing mechanism. The indexing mechanism stores the names of different variables present in the container and stores/obtains values corresponding to those variables. Once created, the container need be responsive only to two commands, a "SET" command and a "GET" command, as follows:

SET (container_name, name, value, type)
GET (container_name, name, buffer, type)

where: container_name is the name of the container in which information is to be gotten or set, name is the name of the information value to be stored or retrieved, value is the value of the named information to be stored, type in the case of a SET is the type of information to be stored, and, in the case of a GET is the type of information retrieved from the container, and buffer is a storage area into which the value of the named information is retrieved by the container. Type may be of two types: data-type or container-type. Data-type simply means that an information value is to be stored in the container. Container-type means that a sub-container has been created within the container_name container.

In the case of an object oriented programming language ("OOPL") the container_name value may be omitted since the "SET" (and "GET", described below) refers to the object being used and container_name is therefore implicit.

Container processing in response to a SET command proceeds as follows. First, the container specified by the container_name variable determines whether the name'd information already exists in its dictionary. If the name does not already exist in the dictionary, then the dictionary is updated to include the name, and the associated type is also stored in the dictionary. If type equals "data-type", then the value of the named information is stored in the container. If type equals "container-type", then the container creates a new container with the specified name.

Processing according to the GET command is as follows. First, the container specified by container_name determines whether the name'd value is in its dictionary. If the name is in the dictionary, then the container stores the value of the name'd information into buffer and stores the type of information into type. On the other hand, if the container_name container's dictionary does not include name, then the container returns an error code.

Preferably, the container is also responsive to at least two other commands, a GET_FIRST command and a GET_NEXT command, as follows:

GET_FIRST (container_name, name_buffer, buffer, type);
GET_NEXT (container_name, name_buffer, buffer, type).

where: name_buffer is a buffer into which the container_name container returns the name of the first name in its dictionary or the next name in its dictionary. The remaining parameters are as described above.

The GET_FIRST and GET_NEXT commands allow a computer process to access information in a container without knowing the names of the information stored in those containers. In response to a GET_FIRST command, a container returns the name of the first item of information stored in the container's dictionary as well as its value and type. In response to a GET_NEXT command, the container returns the next item of named information in its dictionary as well as its value and type.

The container may also be provided with other capabilities for allowing access to information in the container. For example, if desired, the container can be made responsive to so-called "wild card" name queries in which the full name is not provided to the container but instead a template of the name, including wild card characters, is provided to the container. Thus, in response to successive issuances of a command like GET (container_name, STAPL?, X1, X2), a container will iteratively sequence through its dictionary and return values of name'd information whose name begins with the characters "STAPL" (such as "STAPLER-PRESENT", "STAPLE_COUNT", "STAPLING", etc.). Embedded wild card characters may also be supported.

Figure 3A:
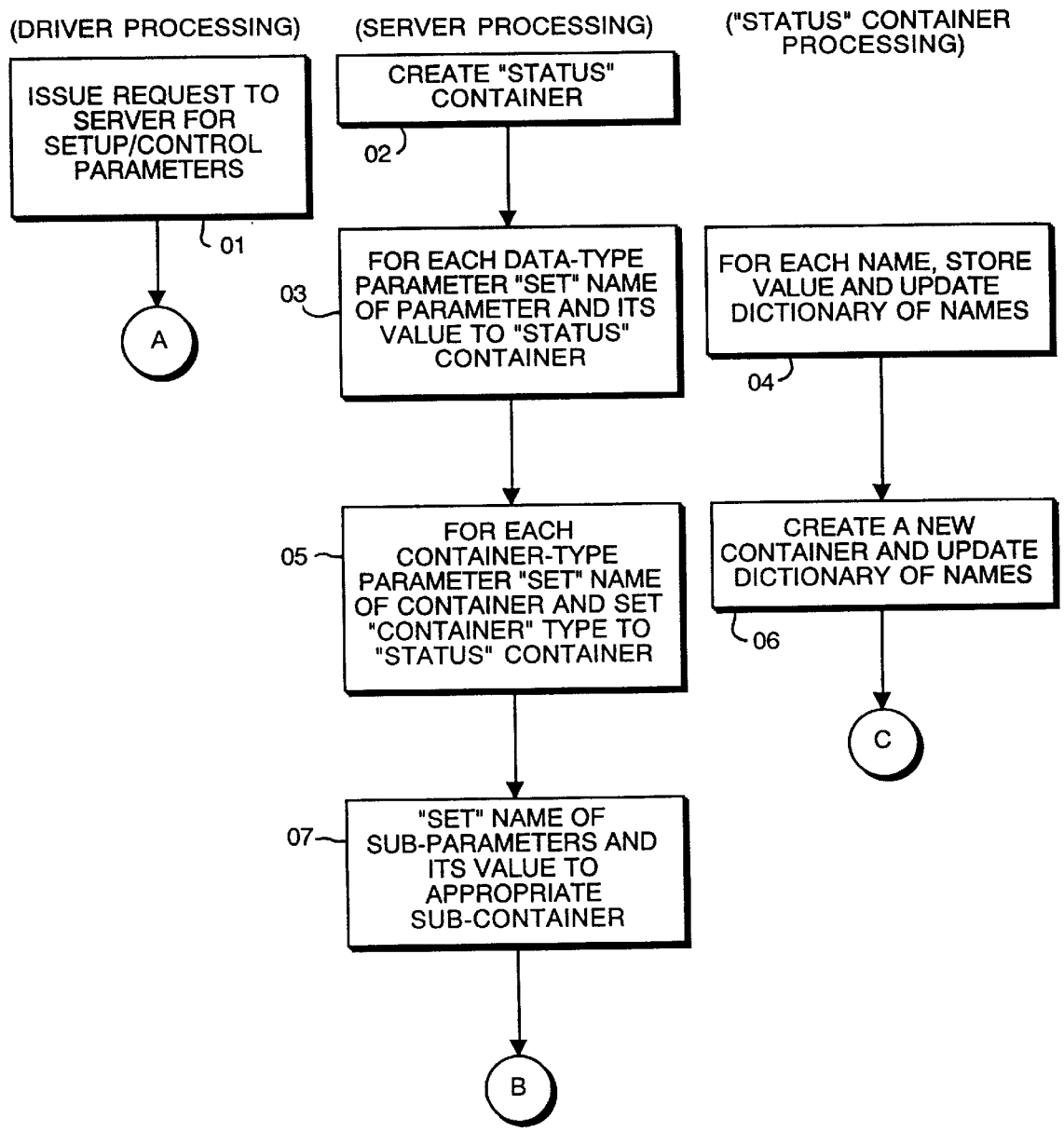
FIGS. 3a, 3b, and 3c are a flow diagram for explaining information exchange according to the invention.
Figure 3B:
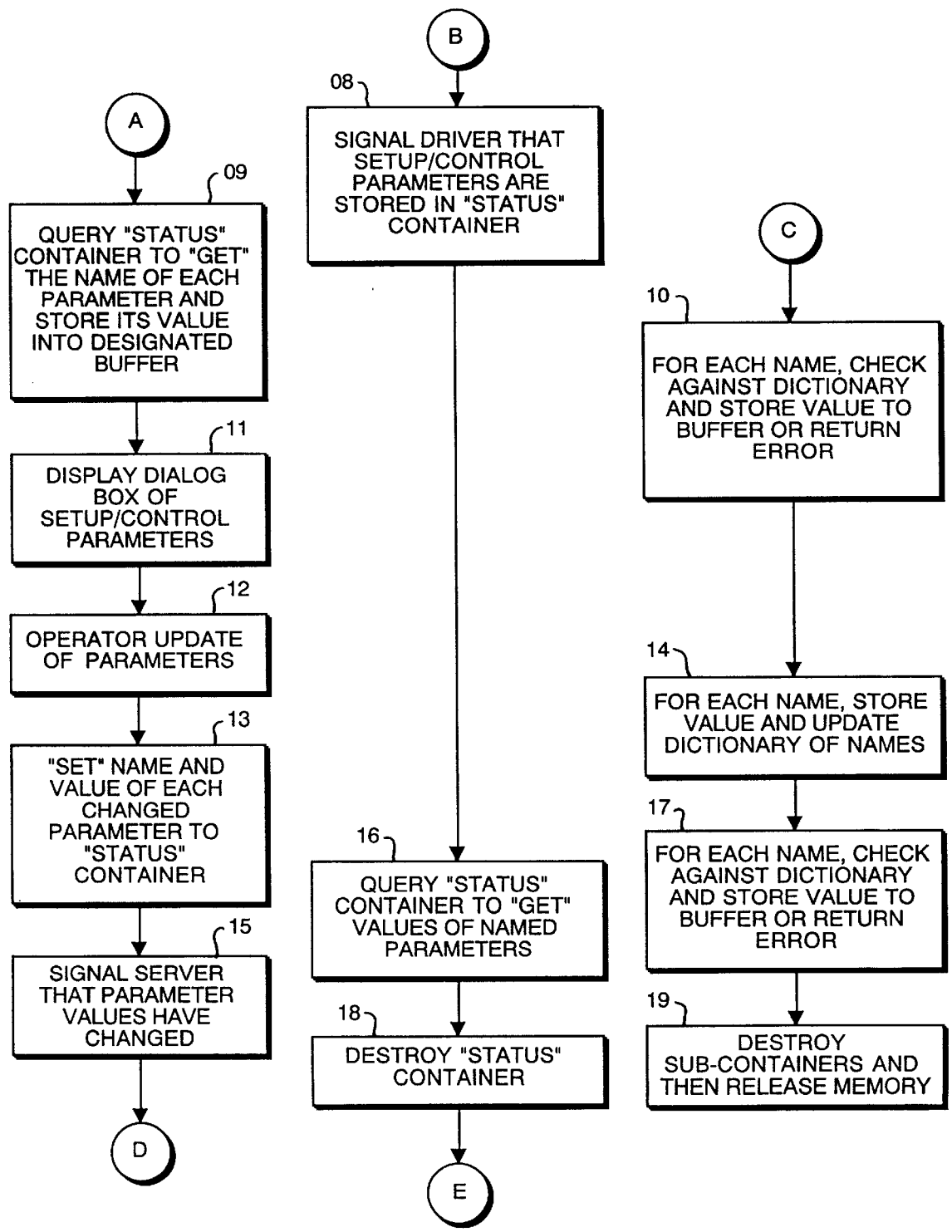
Figure 3C:
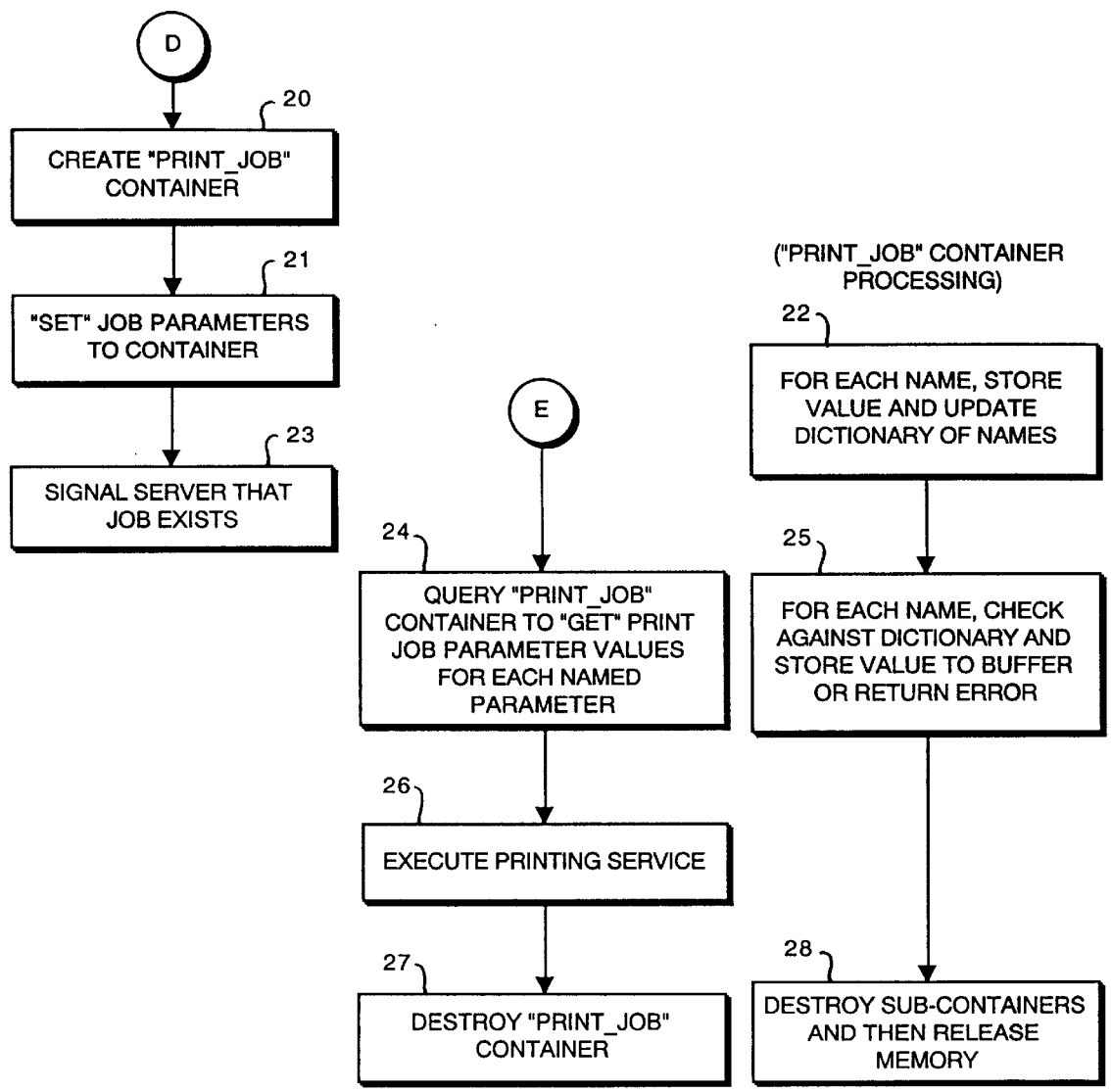
Figure 3:
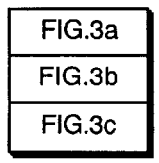

FIG. 3 is a detailed flow chart showing information exchange according to the invention. Because information exchange according to this example involves three different processings, three different flow columns are illustrated in FIG. 3, the first column showing driver processing, the second column showing server processing and the third column showing container processing.

In Step S01 driver 31 issues a request across LAN bus 11 to server 39 for setup and control parameters. When print server 39 receives the request, the server creates a STATUS container (Step S02). Flow advances to Step S03 in which for each data-type setup or control parameter, print server 39 SETS the name of the parameter and its value to the STATUS container. For example, if the print server stores print orientation information (portrait or landscape) in a variable named "Portrait/Landscape", then print server 39 sets that parameter to the STATUS container by issuing the following command:

SET (STATUS, portrait/landscape, "portrait", "data").

Likewise, if print server 39 stores error conditions in a variable named "error_condition," then if the value of that variable is "none" then print server 39 sets the value to the STATUS container using the following command:

SET (STATUS, error_condition, "none", "data").

In response to each such SET command, the STATUS container stores the value of the parameter and updates its dictionary with the parameter name (Step S04).

Because a SET command will automatically overwrite existing name'd information, it is in some circumstances prudent for the print server to test the container before issuing a SET to determine if information already exists in the container with the same name. In this situation, the print server, or any computer process desiring to test the container, first issues a GET command with the desired name. If the name already exists in the container, then a value will be returned and the print server can decide whether or not to proceed with the SET; otherwise the container will return an error code and the print server will know it is safe to proceed with the SET. Using this GET-before-SET sequence, any computer process can ensure that it will not accidentally overwrite needed information.

Such functionality may also be provided directly, for example, through an "ISVARIABLE" function which checks a container for the existence of a variable and returns TRUE if the variable name exists and FALSE otherwise.

This functionality and other types of functionality can be provided by expanding the command set to which the container is responsive.

In Step S05, print server 39 creates additional containers to store more complex setup and control information. For example, in Step S05, print server 39 may store font information which includes the fonts that are available for printing by printer 21, the default font which is automatically selected by printer 21 upon power up, and the currently selected font. While each one of these parameters may be stored individually in Step S03, it is also possible to create a new container which stores all such related information. Thus, in Step S05, for each container-type parameter, print server 39 sets the name of the new container to the STATUS container. For example, to create a FONT container, server 39 issues the following command:

SET (STATUS, "FONT",, container).

In response to such a SET command, the STATUS container creates a new container named "FONT" which has all the functionalities of any container. The STATUS container updates its dictionary of names and includes the container-type qualifier with that dictionary.

In Step S07, print server 39 sets the name of sub-parameters and their values to the appropriate sub-containers. For example, to store font information, the print server 39 issues the following commands:

| | |
|---|---|
| SET (FONT, AVAILABLE_FONTS, | "COURIER_10 PT |
| | COURIER_12 PT |
| | UNIVERS_10 PT |
| | UNIVERS_12 PT |
| | ROMAN_10 PT |
| | ROMAN_12 PT", Data) |
| SET (FONT, DEFAULT_FONT, "COURIER_12 PT", Data) | |
| SET (FONT, CURRENT_FONT, "COURIER_12 PT", Data) | |

In response to each such SET command, the sub-containers execute container processing to store the value of the named information and to update the dictionary in the sub-containers with the appropriate names.

After the print driver has stored all setup and control parameters in the containers, flow advances to Step S08 in which the print server 39 signals driver 31 that setup/control parameters are stored in the STATUS container. Signaling is performed over LAN bus 11 and, in response to the signal, print driver 31 queries the STATUS container to get the name of each parameter in the container and to store its value into designated buffers (Step S09). If the names of all information are known to the driver 31, then driver 31 simply issues a series of GET commands to the status container and to all the sub-containers. On the other hand, if the names are not known, then the driver 31 simply issues a GET_FIRST command followed by sequential GET_NEXT commands so as to sequence through the entire dictionary stored in the STATUS container. In response to the GET commands, the STATUS container will check against its dictionary and return the named values to driver 31. If the named information returned by the status container is data-type information, then driver 31 simply stores the named information if the named information is of interest; otherwise the information is ignored. On the other hand, if the named information returned from the STATUS container is container-type information, then driver 31 issues a further GET command to the sub-container whereby all the information stored in the STATUS container is retrieved.

Flow advances to Step S11 in which driver 31 displays a dialogue box of setup and control parameters to the user. A representative dialogue box is illustrated in FIG. 4. As seen there, the dialogue box simply lists information names and associated information values. The dialogue box further preserves the hierarchy of the container/sub-container structure. More specifically, with respect to the "FONT" sub-container, the dialogue box indicates that a sub-container has been encountered by indenting the information names stored in that sub-container, thereby displaying the setup and control parameters in a hierarchical structure that is the same hierarchical structure that is defined by the print server 39 when it stored those parameters. Significantly, there is no need for a driver 31 to be aware of that hierarchy or indeed even to know the names of the parameters. Both the hierarchy and the names are part of the container and are SET there by the setting computer process.

In Step S12, the computer operator at work station 16 updates the parameters displayed at the work station. For example, the operator may decide to change the current font or to change the default font setting. The operator makes the changes that are desired, whereupon flow advances to Step S13 in which driver 31 sets the name and value of each parameter that has been changed back to the STATUS container or the appropriate sub-containers. In Step S14, the STATUS container, referring to its dictionary, determines that the updated values are already part of the container and therefore does not allocate any additional storage space, but rather simply replaces the value currently stored therein with the new value.

Flow then advances to Step S15 in which driver 31 signals server 39 over LAN bus 11 that setup and control parameter values have been changed. In response, in Step S16, server 39 queries the STATUS container and any sub-containers to GET values of all the named parameters. Note that in this embodiment it is necessary for server 39 to GET the values of all named parameters since driver 31 has not indicated which parameters have been changed. Other arrangements are possible. For example, driver 31 may create a new container named, for example, "CHANGES", and SET to that container the names of all parameters that have been changed. By reference to the "CHANGES" container, the server 39 may determine which parameters have been changed and GET only the changed parameters.

In either event, in response to GET commands from server 39, the STATUS container (or appropriate sub-containers) retrieves the named information from the container by reference to the container's dictionary and provides the requested values to server 39 (Step S17). Flow then advances to Step S18 in which server 39 destroys the STATUS container. In response, the STATUS container first destroys all its sub-containers (Step S19) and then releases its memory.

In Step S20, driver 31 creates a "PRINT_JOB" container. The PRINT_JOB container may be contained in another container if desired; for example, rather than destroying the STATUS container it can be preserved and the PRINT_JOB container created as a sub-container to the STATUS container. In Step S21 driver 31 sets print job parameters to that container. Print job parameters include not only print information, but may also include additional settings such as the font selected specifically for the print job or the current orientation (portrait or landscape) for printing. In Step S22, the PRINT_JOB container updates its dictionary with the names of the SET information, and stores the values of that information. Flow then advances to Step S23 in which driver 31 signals server 39 via LAN bus 11 that a print job exists in container PRINT_JOB, or that the PRINT_JOB container has been placed in the job queue. In response, in Step S24, server 39 queries the print job container to GET print job parameter values. The PRINT_JOB container provides the print job parameters (Step S25) and in Step S26 the print server 39 executes the requested printing service on printer 21. Flow advances to Step S27 in which print server 39 destroys the PRINT_JOB container, in response to which, the PRINT_JOB container destroys its sub-containers and then releases its memory space (Step S28).

What is claimed is:

1. A method which uses a container object accessible by first and second computer processes to exchange both names of information and corresponding values of information between the first and second computer processes, the information being stored at a storage location accessible by the container object, comprising the steps of:

executing the first computer process to set a new character-based information name into the container object and to set a corresponding information value into the container object; and executing the second computer process to get the information value from the container object by providing the information name to the container object and by requesting the container object to deposit the corresponding information value into a buffer based at least in part on the character-based information name but not based on the storage location, for use by the second computer process.

2. A method according to claim 1, wherein the first computing process also sets information type into the container and wherein the second computing process gets the type of information from the container.

3. A method according to claim 1, further comprising the step of executing container processing to (a) store an information value in response to a set command from the first computer process, and (b) update a dictionary of information names in the case where the information name set by the first computer process is not already in the dictionary.

4. A method according to claim 1, further comprising the step of executing the first computer process to signal the second computer process that information has been set to the container.

5. A method according to claim 1, further comprising the step of executing the second computer process-to get first-named information in the container.

6. A method according to claim 1, further comprising the step of executing of the second process to get information values by providing wild card information names to the container.

7. A method according to claim 1 wherein the information name is linguistically indicative of the corresponding information value.

8. A method according to claim 1, wherein the container has a dictionary for storing character-based information names for identifying the respectively corresponding information values in the container, and wherein said method further comprises a first name retrieval step of executing the second computer process to retrieve the first character-based information name in the dictionary.

9. A method according to claim 1, wherein the container has a dictionary for storing character-based information names for identifying the respectively corresponding information values in the container, and wherein said method further comprises a wild card retrieval step of comparing each of the character-based information names stored in the dictionary of the container with a name having wild card information and retrieving matching character-based information names in accordance with the comparison.

10. A method according to claim 1, further comprising a name retrieval step of executing the second computer process to iteratively retrieve each of the character-based information names in the container in a case where character-based names were not previously known in the second computer process, wherein said step of executing the second computer process to get the information value from the container by providing the information name to the container is repeated for each character-based information name retrieved in said name retrieval step.

11. A method according to claim 1, wherein said first computer process is a print driver for receiving print commands from an application program, wherein said second computer process is a print server for controlling a printer, and wherein the information values in the container are values for controlling the operation of the printer.

12. A method according to claim 5, further comprising the step of getting subsequently-named information from the container.

13. A method according to claim 2, wherein the types include container-type information and data-type information.

14. A method according to claim 3, further comprising the step of executing container processing to (a) compare the information name provided by the second computer process to the dictionary of names, (b) deposit the corresponding information value into the buffer in a case where the information name is in the dictionary of names, and (c) deposit an error code in the case where the dictionary of information names does not include the information name.

15. A method according to claim 8, further comprising a subsequent-name retrieval step of executing the second computer process to retrieve a subsequent character-based information name in the dictionary.

16. A method according to claim 10, wherein the container includes at least one sub-container, and said name-retrieval step recursively retrieves each of the character-based information names in the container and the at least one sub-container.

17. A method according to claim 11, wherein the information values in the container are selected from the group consisting of those related to the paper size, paper feeding, paper orientation, fonts, printer error, print job status, duplex printing, collating, and stapling.

18. A method according to claim 11, wherein said print server creates the container and iteratively executes said step of executing the first computer process to set a new character-based information name into the container for each of the values for controlling the operation of the printer.

19. A method according to claim 16, further comprising a step of displaying (a) the information names and respectively corresponding information values and (b) a container/sub-container hierarchy.

20. A method according to claim 13, wherein in the case where the container provides container-type information to the second computer process, the value deposited into the designated buffer is the name of a second container.

21. A method according to claim 14, wherein the first computer process, before setting an information value into the container, gets the information value from the container and does not set the information value into the container unless an error code is returned.

22. A method according to claim 14, further comprising the step of executing container processing to store the information name and the information value corresponding to the first entry in the dictionary of information names in response to a command to get first-named information.

23. A method according to claim 22, further comprising the step of storing the information name and information value corresponding to subsequent entries in the dictionary of information names in response to a command to get subsequently-named information.

24. A method according to claim 20, further comprising the step of executing the first computer process to set an information name and corresponding information value into the second container.

25. A method according to claim 20, further comprising the step of executing the second computer process to get the information value from the second container by providing the information name to the second container and requesting the second container to deposit the corresponding information value into a buffer.

26. A method according to claim 25, further comprising the step of displaying information names and their corresponding information values in a hierarchical display such that the relative hierarchy of containers is visually apparent.

27. A method according to claim 26, further comprising the step of changing displayed information values.

28. A method according to claim 27, further comprising the step of setting changed values to the container.

29. A method according to claim 28, further comprising the step of getting changed values from the container.

30. A network-based method which uses a container object accessible by a client process which executes in a first network device on a local area network and which outputs requests for service, and accessible by a server process which executes in a second network device on the local area network and which services those requests, the network-based method for exchanging both names of information and corresponding values of information between the client process and the server process, the information being stored at a storage location accessible by the container object, comprising the steps of:

executing the server process to set a new character-based information name into the container object and also to set a corresponding information value into the container object;

signalling the client process, via the local area network, that the new information name and corresponding information value have been set to the container object; and executing the client process to get the information value from the container object by providing the information name to the container object and by requesting the container object to deposit the corresponding information value into a buffer based at least in part on the character-based information name but not based on the storage location, for use by the client process.

31. A method according to claim 30, wherein the server process also sets information type into the container and wherein the client process gets the type of information from the container.

32. A method according to claim 30, further comprising the step of executing container processing to (a) store an information value in response to a set command from the server process, and (b) update a dictionary of information names in the case where the information name set by the server process is not already in the dictionary.

33. A method according to claim 30, further comprising the step of executing the server process to signal the client process that information has been set to the container.

34. A method according to claim 30, further comprising the step of executing the client process to get first-named information in the container.

35. A method according to claim 30 wherein the information name is linguistically indicative of the corresponding information value.

36. A method according to claim 31, wherein the types include container-type information and data-type information.

37. A method according to claim 32, further comprising the step of executing container processing to (a) compare the information name provided by the client process to the dictionary of names, (b) deposit the corresponding information value into the buffer in a case where the information name is in the dictionary of names, and (c) deposit an error code in the case where the dictionary of information names does not include the information name.

38. A method according to claim 34, further comprising the step of getting subsequently-named information from the container.

39. A method according to claim 30, further comprising the step of executing of the client process to get information values by providing wild card information names to the container.

40. A method according to claim 36, wherein in the case where the container provides container-type information to the client process, the value deposited into the designated buffer is the name of a second container.

41. A method according to claim 37, wherein the server process, before setting an information value into the container, gets the an information value from the container and does not set the information value into the container unless an error code is returned.

42. A method according to claim 37, further comprising the step of executing container processing to store the information name and the information value corresponding to the first entry in the dictionary of information names in response to a command to get first-named information.

43. A method according to claim 40, further comprising the step of executing the server process to set an information name and corresponding information value into the second container.

44. A method according to claim 40, further comprising the step of executing the client process to get the information value from the second container by providing the information name to the second container and requesting the second container to deposit the corresponding information value into a buffer.

45. A method according to claim 42, further comprising the step of storing the information name and information value corresponding to subsequent entries in the dictionary of information names in response to a command to get subsequently-named information.

46. A method according to claim 44, further comprising the step of displaying information names and their corresponding values in a hierarchical display such that the relative hierarchy of containers is visually apparent.

47. A method according to claim 46, further comprising the step of changing displayed information values.

48. A method according to claim 47, further comprising the step of setting changed values to the container.

49. A method according to claim 48, further comprising the step of signalling the server process via the local area network that changed values have been set to the container, and the step of executing the server process to get changed values from the container.

50. A method according to claim 49, wherein information values and names in the first and second containers relate to parameters which control functionality of the server process.

51. A method according to claim 30, wherein the server process is a peripheral server process.

52. A method according to claim 51, further comprising the step of executing the client process to set peripheral job information to a container.

53. A method according to claim 52, further comprising the step of executing the peripheral server process to get job information from the container and to output the job information on the peripheral.

54. A computer-implemented method for retrieving setup and control parameters by which a peripheral device is configured for operability, the peripheral device being controlled in accordance with the setup and control parameters by a peripheral server, the computer-implemented method comprising the steps of:

issuing a request to the peripheral server for setup and control parameters;

receiving the name of a container object into which character-based names of the setup and control parameters have been set, and into which corresponding values of the setup and control parameters have also been set, the names and values being stored at a storage location accessible by the container object;

querying the container object successively to get the name of each setup and control parameter based at least in part on the character-based name but not based on the storage location;

providing the name of each setup and control parameter to the container object with a request to get the corresponding value of the setup and control parameter whose name was so provided; and retrieving the corresponding value of the setup and control parameters from a buffer into which the container object has stored it.

55. A method according to claim 54, wherein said querying step comprises the step of issuing a command to the container to get the name of the first setup and control parameter stored in the container.

56. A method according to claim 54, further comprising the step of displaying the names of the setup and control parameters and their corresponding values.

57. A method according to claim 54, wherein said querying step includes the step of querying the container for the type of information stored in the container.

58. A method according claim 54, further comprising the step of creating a peripheral job container.

59. A method according to claim 54 wherein the names of the setup and control parameters are linguistically indicative of the corresponding values of the setup and control parameters.

60. A method according to claim 55, further comprising the step of querying the container to get the name of subsequently stored parameters in the container.

61. A method according to claim 56, further comprising the step of changing values of displayed parameters.

62. A method according to claim 57, wherein the type of information includes data-type information and container-type information.

63. A method according to claim 57, wherein said querying step comprises the steps of querying the container to get the name of a sub-container and querying the sub-container to get the names of setup and control parameters in the sub-container and to get the values of setup and control parameters in the sub-container by providing the sub-container with setup and control parameter names.

64. A method according to claim 58, further comprising the step of setting names and values of job parameters to the peripheral job container.

65. A method according to claim 61, further comprising the step of setting changed values of parameters back to the container by providing the name and value of the parameters to the container.

66. A method according to claim 63, further comprising the step of displaying the names and values of the setup and control parameters hierarchically in accordance with the hierarchy of containers and sub-containers.

67. A method according to claim 64, further comprising the step of signalling the peripheral server that job parameters exist in the peripheral-job container.

68. A method according to claim 65, further comprising the step of signalling the peripheral server that parameter values have been changed.

69. A method according to claim 67, further comprising the step of executing the peripheral server to get names and values of job parameters from the peripheral-job container, and to control the peripheral in accordance with the job parameter.

70. A method according to claim 69, wherein the peripheral comprises a printer.

71. A computer-implemented process for altering setup and control parameters which control functionality of a peripheral, comprising the steps of:

receiving a request for the parameters;

creating a container object;

setting character-based parameter names into the container object and also setting corresponding parameter values into the container object, the names and values being stored at a storage location accessible by the container object;

signalling that the parameters are stored in the container object;

receiving an indication that parameter values have been altered;

getting parameter values from the container object by successively providing a parameter name to the container object and requesting the container object to deposit the corresponding parameter value into a buffer based at least in part on the character-based name but not based on the storage location; and altering at least those setup and control parameters whose values have changed from those set in said setting step, based on the parameter values deposited in the buffer.

72. A method according to claim 71, further comprising the step of setting an information type to the container.

73. A method according to claim 71, further comprising the step of destroying the container.

74. A method according to claim 71, further comprising the step of querying a peripheral job container to get named job parameter values for the peripheral in response to a signal indicating that a peripheral job exists in the peripheral job container.

75. A method according to claim 71, wherein the peripheral is a printer.

76. A method according to claim 71 wherein the parameter names are linguistically indicative of the corresponding parameter values.

77. A process according to claim 71, wherein the character-based parameter names set in said setting step are new names in the container.

78. A method according to claim 72, wherein type includes data-type information and container-type information.

79. A method according to claim 74, further comprising the step of executing the peripheral service.

80. A method according to claim 78, further comprising the step of setting container-type information including the name of a sub-container to the container.

81. A method according to claim 79, further comprising the step of destroying the print job container.

82. A method according to claim 80, further comprising the step of setting names and values of parameters to the sub-container.

83. A computer-implemented container object process comprising the steps of:

responding to commands to set both new character-based names of information and corresponding information values into the container object by updating a dictionary of information names and by storing the corresponding information value of the named information, the information being stored at a storage location accessible by the container object; and responding to commands to get named information by checking the name against the dictionary of names, based at least in part on the character-based name but not based on the storage location and, in a case where the name is in the dictionary of names, returning the corresponding information value and, in a case where the name is not in the dictionary of names, returning an error code.

84. A container process according to claim 83, wherein said step of responding to set commands includes the step of storing the type of named information.

85. A container process according to claim 83, further comprising the step of responding to a command to get first-named information by returning the name of the first name in the dictionary and returning the value of the first named information.

86. A container process according to claim 83, further comprising the step of responding to commands to destruct by destroying sub-containers and releasing memory.

87. A container process according to claim 83 wherein the names of information are linguistically indicative of the corresponding information values.

88. A container process according to claim 84, wherein the type of information includes data-type information and container-type information.

89. A container process according to claim 85, further comprising the step of responding to commands to get subsequently-named information by returning the name of subsequent names in the dictionary and the value of the subsequently named information.

90. A container process according to claim 88, wherein in response to a command to store container-type information, further comprising the step of creating a sub-container with the named value.

91. An apparatus which uses a container object accessible by first and second computer processes for exchanging names of information and corresponding values of information between the first and second computer, the information being stored at a storage location accessible by the container object, processes comprising:

a memory for storing instruction sequences by which names and values of information between first and second computer processes are exchanged; and a processor for executing the stored instruction sequences;

wherein the stored instruction sequences include process steps to cause said processor to (a) execute the first computer process to set a new character-based information name into the container object and to set a corresponding information value into the container object, and (b) to execute the second computer process to get the information value from the container object by providing the information name to the container object and to request the container object to deposit the corresponding information value into a buffer based at least in part on the character-based name but not based on the storage location, for use by the second computer process.

92. An apparatus according to claim 91 wherein the information name is linguistically indicative of the corresponding information value.

93. A network-based apparatus which uses a container object accessible by a client process which executes in a first network device on a local area network and which outputs requests for service, and accessible by a server process which executes in a second network device on the local area network and which services those requests, said network-based apparatus for exchanging both names of information and corresponding values of information between the client process and the server process, the information being stored at a storage location accessible by the container object, comprising:

a memory for storing instruction sequences by which information between a client process and a server process, executing on first and second network devices, respectively, is exchanged; and a processor for executing the stored instruction sequences;

wherein the stored instruction sequences include process steps to cause said processor to (a) execute the server process to set a new character-based information name into the container object and also to set a corresponding information value into the container object, (b) signal the client process, via the local area network, that an information name and corresponding information value have been set to the container object, and (c) execute the client process to get the information value from the container object by providing the information name to the container object and to request the container object to deposit the corresponding information value into a buffer based at least in part on the character-based name but not based on the storage location, for use by the client process.

94. An apparatus according to claim 93 wherein the information name is linguistically indicative of the corresponding information value.

95. An apparatus for altering setup and control parameters which control functionality of a peripheral, comprising:

a memory for storing instruction sequences by which setup and control parameters are altered; and a processor for executing the stored instruction sequences;

wherein the stored instruction sequences include process steps to cause said processor to (a) receive a request for the parameters, (b) create a container object, (c) set character-based parameter names into the container object and also set corresponding parameter values into the container object, the names and values being stored at a storage location accessible by the container object, (d) signal that the parameters are stored in the container object, (e) receive an indication that parameter values have been altered, (f) get parameter values from the container object by successively providing a parameter name to the container object and requesting the container object to deposit the corresponding parameter value into a buffer based at least in part on the character-based name but not based on the storage location, and (g) alter at least those setup and control parameters whose values have changed from those set based on the parameter value deposited in the buffer.

96. An apparatus according to claim 95 wherein the parameter names are linguistically indicative of the corresponding parameter values.

97. An apparatus according to claim 95, wherein the character-based parameter names set in the setting process step of the stored instruction sequences are new names in the container.

98. Computer-executable process steps stored on a computer-readable medium, the computer-executable process steps to use a container object accessible by first and second computer processes to exchange both names of information and corresponding values of information between the first and second computer processes, the information being stored at a storage location accessible by the container object, the computer-executable process steps comprising:
- a first process executing step to execute the first computer process to set a new character-based information name into the container object and to set a corresponding information value into the container object; and
- a second process executing step to execute the second computer process to get the information value from the container object by providing the information name to the container object and by requesting the container object to deposit the corresponding information value into a buffer based at least in part on the character-based name but not based on the storage location, for use by the second computer process.

99. Computer-executable process steps according to claim 98, wherein the first computer process also sets information type into the container and wherein the second computer process gets the type of information from the container.

100. Computer-executable process steps according to claim 98, further comprising a step to execute container processing to (a) store an information value in response to a set command from the first computer process, and (b) update a dictionary of information names in the case where the information name set by the first computer process is not already in the dictionary.

101. Computer-executable process steps according to claim 98, further comprising a step to execute the first computer process to signal the second computer process that information has been set to the container.

102. Computer-executable process steps according to claim 98, further comprising a step to execute the second computer process to get first-named information in the container.

103. Computer-executable process steps according to claim 98, further comprising a step to execute the second process to get information values by providing wild card information names to the container.

104. Computer-executable process steps according to claim 98 wherein the information name is linguistically indicative of the corresponding information value.

105. Computer-executable process steps according to claim 99, wherein the types include container-type information and data-type information.

106. Computer-executable process steps according to claim 100, further comprising a step to execute container processing to (a) compare the information name provided by the second computer process to the dictionary of names, (b) deposit the corresponding information value into the buffer in a case where the information name is in the dictionary of names, and (c) deposit an error code in the case where the dictionary of information names does not include the information name.

107. Computer-executable process steps according to claim 102, further comprising a step to get subsequently-named information from the container.

108. Computer-executable process steps according to claim 105, wherein in the case where the container provides container-type information to the second computer process, the value deposited into the designated buffer is the name of a second container.

109. Computer-executable process steps according to claim 106, wherein the first computer process, before setting an information value into the container, gets the information value from the container and does not set the information value into the container unless an error code is returned.

110. Computer-executable process steps according to claim 106, further comprising a step to execute container processing to store the information name and the information value corresponding to the first entry in the dictionary of information names in response to a command to get first-named information.

111. Computer-executable process steps according to claim 108, further comprising a step to execute the first computer process to set an information name and corresponding information value into the second container.

112. Computer-executable process steps according to claim 108, further comprising a step to execute the second computer process to get the information value from the second container by providing the information name to the second container and to request the second container to deposit the corresponding information value into a buffer.

113. Computer-executable process steps according to claim 110, further comprising a step to store the information name and information value corresponding to subsequent entries in the dictionary of information names in response to a command to get subsequently-named information.

114. Computer-executable process steps according to claim 112, further comprising a step to display information names and their corresponding information values in a hierarchical display such that the relative hierarchy of containers is visually apparent.

115. Computer-executable process steps according to claim 114, further comprising a step to change displayed information values.

116. Computer-executable process steps according to claim 115, further comprising a step to set changed values to the container.

117. Computer-executable process steps according to claim 116, further comprising a step to get changed values from the container.

118. Computer-executable process steps stored on a computer-readable medium, the computer-executable process steps to use a container object accessible by a client process which executes in a first network device on a local area network and which outputs requests for service, and accessible by a server process which executes in a second network device on the local area network and which services those requests, the computer-executable process steps to exchange both names of information and corresponding values of information between the client process and the server process, the information being stored at a storage location accessible by the container object, the computer-executable process steps comprising:
- a server process executing step to execute the server process to set a new character-based information name into the container object and also to set a corresponding information value into the container object;
- a signalling step to signal the client process, via the local area network, that the information name and corresponding information value have been set to the container object; and a client process executing step to execute the client process to get the information value from the container object by providing the information name to the container object and by requesting the container object to deposit the corresponding information value into a buffer based at least in part on the character-based name but not based on the storage location, for use by the client process.

119. Computer-executable process steps according to claim 118, wherein the server process also sets information type into the container and wherein the client process gets the type of information from the container.

120. Computer-executable process steps according to claim 118, further comprising a step to execute container processing to (a) store an information value in response to a set command from the server process, and (b) update a dictionary of information names in the case where the information name set by the server process is not already in the dictionary.

121. Computer-executable process steps according to claim 118, further comprising a step to execute the server process to signal the client process that information has been set to the container.

122. Computer-executable process steps according to claim 118, further comprising a step to execute the client process to get first-named information in the container.

123. Computer-executable process steps according to claim 118, further comprising a step to execute the client process to get information values by providing wild card information names to the container.

124. Computer-executable process steps according to claim 118, wherein the server process is a peripheral server process.

125. Computer-executable process steps according to claim 118 wherein the information name is linguistically indicative of the corresponding information value.

126. Computer-executable process steps according to claim 119, wherein the types include container-type information and data-type information.

127. Computer-executable process steps according to claim 120, further comprising a step to execute container processing to (a) compare the information name provided by the client process to the dictionary of names, (b) deposit the corresponding information value into the buffer in a case where the information name is in the dictionary of names, and (c) deposit an error code in the case where the dictionary of information names does not include the information name.

128. Computer-executable process steps according to claim 122, further comprising a step to get subsequently-named information from the container.

129. Computer-executable process steps according to claim 124, further comprising a step to execute the client process to set peripheral job information to a container.

130. Computer-executable process steps according to claim 126, wherein in the case where the container provides container-type information to the client process, the value deposited into the designated buffer is the name of a second container.

131. Computer-executable process steps according to claim 127, wherein the server process, before setting an information value into the container, gets the an information value from the container and does not set the information value into the container unless an error code is returned.

132. Computer-executable process steps according to claim 127, further comprising a step to execute container processing to store the information name and the information value corresponding to the first entry in the dictionary of information names in response to a command to get first-named information.

133. Computer-executable process steps according to claim 129, further comprising a step to execute the peripheral server process to get job information from the container and to output the job information on the peripheral.

134. Computer-executable process steps according to claim 130, further comprising a step to execute the server process to set an information name and corresponding information value into the second container.

135. Computer-executable process steps according to claim 130, further comprising a step to execute the client process to get the information value from the second container by providing the information name to the second container and requesting the second container to deposit the corresponding information value into a buffer.

136. Computer-executable process steps according to claim 132, further comprising a step to store the information name and information value corresponding to subsequent entries in the dictionary of information names in response to a command to get subsequently-named information.

137. Computer-executable process steps according to claim 135, further comprising a step to display information names and their corresponding values in a hierarchical display such that the relative hierarchy of containers is visually apparent.

138. Computer-executable process steps according to claim 137, further comprising a step to change displayed information values.

139. Computer-executable process steps according to claim 138, further comprising a step to set changed values to the container.

140. Computer-executable process steps according to claim 139, further comprising a step to signal the server process via the local area network that changed values have been set to the container, and a step to execute the server process to get changed values from the container.

141. Computer-executable process steps according to claim 140, wherein information values and names in the first and second containers relate to parameters which control functionality of the server process.

142. Computer-executable process steps stored on a computer-readable medium, the computer-executable process steps to retrieve setup and control parameters by which a peripheral device is configured for operability, the peripheral device being controlled in accordance with the setup and control parameters by a peripheral server, the computer-executable process steps comprising:

an issuing step to issue a request to the peripheral server for setup and control parameters;

a receiving step to receive the name of a container object into which character-based names of the setup and control parameters have been set, and into which corresponding values of the setup and control parameters have also been set, the names and values being stored at a storage location accessible by the container object;

a querying step to query the container object successively to get the name of each setup and control parameter;

a name providing step to provide the name of each setup and control parameter to the container object with a request to get the corresponding value of the setup and control parameter whose name was so provided; and a retrieving step to retrieve the corresponding value of the setup and control parameters from a buffer based at least in part on the character-based name but not based on the storage location into which the container object has stored it.

143. Computer-executable process steps according to claim 142, wherein said querying step comprises a step to issue a command to the container to get the name of the first setup and control parameter stored in the container.

144. Computer-executable process steps according to claim 142, further comprising a step to display the names of the setup and control parameters and their corresponding values.

145. Computer-executable process steps according to claim 142, wherein said querying step includes a step to query the container for the type of information stored in the container.

146. Computer-executable process steps according claim 142, further comprising a step to create a peripheral job container.

147. Computer-executable process steps according to claim 142 wherein the names of the setup and control parameters are linguistically indicative of the corresponding values of the setup and control parameters.

148. Computer-executable process steps according to claim 143, further comprising a step to query the container to get the name of subsequently stored parameters in the container.

149. Computer-executable process steps according to claim 144, further comprising a step to change values of displayed parameters.

150. Computer-executable process steps according to claim 145, wherein the type of information includes data-type information and container-type information.

151. Computer-executable process steps according to claim 145, wherein said querying step comprises steps to query the container to get the name of a sub-container and to query the sub-container to get the names of setup and control parameters in the sub-container and to get the values of setup and control parameters in the sub-container by providing the sub-container with setup and control parameter names.

152. Computer-executable process steps according to claim 146, further comprising a step to set names and values of job parameters to the peripheral job container.

153. Computer-executable process steps according to claim 149, further comprising a step to set changed values of parameters back to the container by providing the name and value of the parameters to the container.

154. Computer-executable process steps according to claim 151, further comprising a step to display the names and values of the setup and control parameters hierarchically in accordance with the hierarchy of containers and sub-containers.

155. Computer-executable process steps according to claim 152, further comprising a step to signal the peripheral server that job parameters exist in the peripheral-job container.

156. Computer-executable process steps according to claim 153, further comprising a step to signal the peripheral server that parameter values have been changed.

157. Computer-executable process steps according to claim 155, further comprising a step to execute the peripheral server to get names and values of job parameters from the peripheral-job container, and to control the peripheral in accordance with the job parameter.

158. Computer-executable process steps according to claim 157, wherein the peripheral comprises a printer.

159. Computer-executable process steps stored on a computer-readable medium, the computer-executable process steps to alter setup and control parameters which control functionality of a peripheral, the computer-executable process steps comprising:

a request receiving step to receive a request for the parameters;

a creating step to create a container object;

a setting step to set character-based parameter names into the container object and also setting corresponding parameter values into the container object, the names and values being stored at a storage location accessible by the container object;

a signalling step to signal that the parameters are stored in the container object;

an indication receiving step to receive an indication that parameter values have been altered;

a step to get parameter values from the container object by successively providing a parameter name to the container object and requesting the container object to deposit the corresponding parameter value into a buffer based at least in part on the character-based name but not based on the storage location; and an altering step to alter at least those setup and control parameters whose values have changed from those set in said setting step, based on the parameter values deposited in the buffer.

160. Computer-executable process steps according to claim 159, further comprising a step to set an information type to the container.

161. Computer-executable process steps according to claim 159, further comprising a step to query a peripheral job container to get named job parameter values for the peripheral in response to a signal indicating that a peripheral job exists in the peripheral job container.

162. Computer-executable process steps according to claim 159, wherein the peripheral is a printer.

163. Computer-executable process steps according to claim 159 wherein the parameter names are linguistically indicative of the corresponding parameter values.

164. Computer-executable process steps according to claim 159, wherein the character-based parameter names set in said setting step are new names in the container.

165. Computer-executable process steps according to claim 160, wherein type information includes data-type and container-type information.

166. Computer-executable process steps according to claim 161, further comprising a step to execute the peripheral service.

167. Computer-executable process steps according to claim 165, further comprising a step to set container-type information including the name of a sub-container to the container.

168. Computer-executable process steps according to claim 166, further comprising a step to destroy the print job container.

169. Computer-executable process steps according to claim 167, further comprising a step to set names and values of parameters to the sub-container.

170. Computer-executable process steps according to claim 159, further comprising a step to destroy the container.

171. Computer-executable process steps comprising:

a responding step to respond to commands to set both new character-based names of information and corresponding information values into a container object by updating a dictionary of information names and by storing the corresponding information value of the named information, the information being stored at a storage location accessible by the container object; and a second responding step to respond to commands to get named information by checking the name against the dictionary of names based at least in part on the character-based name but not based on the storage location and, in a case where the name is in the dictionary of names, returning the corresponding information value and, in a case where the name is not in the dictionary of names, returning an error code.

172. Computer-executable process steps according to claim 171, wherein said first responding step includes a step to store the type of named information.

173. Computer-executable process steps according to claim 171, further comprising a step to respond to a command to get first-named information by returning the name of the first name in the dictionary and returning the value of the first named information.

174. Computer-executable process steps according to claim 171, further comprising a step to respond to commands to destruct by destroying sub-containers and releasing memory.

175. Computer-executable process steps according to claim 171 wherein the names of information are linguistically indicative of the corresponding information values.

176. Computer-executable process steps according to claim 172, wherein the type of information includes data-type information and container-type information.

177. Computer-executable process steps according to claim 173, further comprising a step to respond to commands to get subsequently-named information by returning the name of subsequent names in the dictionary and the value of the subsequently named information.

178. Computer-executable process steps according to claim 176, further comprising a step to create a sub-container with the named value in response to a command to store container-type information.

* * * * *

UNITED STATES PATENT AND TRADEMARK OFFICE
CERTIFICATE OF CORRECTION

PATENT NO. : 6,230,211 B1
DATED : May 8, 2001
INVENTOR(S) : Rakesh Mahajan

It is certified that error appears in the above-identified patent and that said Letters Patent is hereby corrected as shown below:

Column 1,
Line 15, "The" should read -- the --.

Column 2,
Line 10, "a" should read -- an --.

Column 9,
Line 42, "process-to" should read -- process to --.

Column 12,
Line 21, "of" (second occurrence) should be deleted.
Line 29, "an" should be deleted.

Column 15,
Line 47, "subsequently named" should read -- subsequently-named --.

Column 19,
Line 63, "an" should be deleted.

Column 24,
Line 12, "subsequently named" should read -- subsequently-named --.

Signed and Sealed this

Twenty-sixth Day of March, 2002

*Attest:*

JAMES E. ROGAN
*Director of the United States Patent and Trademark Office*

*Attesting Officer*